Patented Mar. 30, 1954

2,673,804

UNITED STATES PATENT OFFICE 2,673,804

TREATING ANIMAL TISSUE

Levi S. Paddock, Chicago, Ill., assignor to Swift & Company, Chicago, Ill., a corporation of Illinois No Drawing. Application April 10, 1950, Serial No. 155,128

3 Claims. (Cl. 99—159)

The present invention relates to a method of treating substantially non-pigmented animal tissue and more particularly to an improved method of processing honeycomb tripe to improve the appearance and texture thereof.

Tripe is a fancy meat derived from the stomach of cattle. It is customary to remove a portion of the stomach of cattle called the reticulum or "honeycomb" and process it separately from the remainder of the stomach. The "honeycomb," after being rinsed with water to remove the contents, is placed in a scalding tank and immersed in water containing soda ash at a temperature of approximately 130° F. for a period of between 10 and 20 minutes while continuously agitating. During this washing operation the mucous membrane of the "honeycomb" is removed. The "honeycomb" then passes directly into a cooking kettle where it is boiled for approximately 2½ hours. The cooked honeycomb tripe is then customarily placed in a pickling vat containing a suitable pickling solution and allowed to remain in said pickling solution for approximately 20 days or until it has acquired the desired pickled flavor.

An appreciable portion of the pickled tripe prepared in the foregoing manner does not have a pleasing, white appearance nor an entirely satisfactory texture. The natural appearance of the honeycomb tripe seems to depend largely on the eating habits of the cattle, and the surface thereof often appears somewhat stained or darkened. Although the alkaline washing step removes the mucous membrane of the honeycomb tripe and thereby improves the appearance greatly, there is still considerable variation in the appearance of the individual honeycomb tripe after pickling. As the light appearing tripe is strongly preferred by the consumer, a method of improving the appearance of the tripe has long been desired. It has also been found that when tripe is pickled in accordance with the herein disclosed process, the tripe will have a substantially improved texture as a result of more complete absorption of the pickling solution by the folds of the tripe and a more complete penetration of the tripe by the pickling solution.

Thus, it is an object of the present invention to provide a process of treating tripe to improve the appearance thereof.

A further object of this invention is to provide a process of treating tripe to improve the texture thereof.

A still further object of the invention is to provide a process of treating tripe to increase its rate of absorption of a pickling solution.

The above and additional objects of this invention are achieved by subjecting tripe, after passing through the conventional washing, scalding and cooking operation, to the step of immersing the cooked tripe in a treating bath containing a small amount of an oxidizing agent in the presence of an acidic reagent. In the preferred embodiment of the invention the cooked tripe is placed in a treating bath comprising a dilute solution of hydrogen peroxide and a small percentage of acetic acid and allowed to remain in the said bath for a period of about 24 hours, although more or less time, such as from 6 to 30 hours, may be required depending on the initial condition of the tripe. The temperature of the treating bath is preferably maintained between about 70° and 75° F., although the temperature of the bath may be substantially lower or higher without materially altering the results. For example, the temperature of the bath may be much higher at the beginning of the treating process and allowed to fall considerably below the preferred temperature range at the end of the treating process. After the tripe has remained in the treating bath for preferably approximately 24 hours, it is removed and placed in a container filled with running water and allowed to remain there approximately 24 hours with occasional stirring to insure the complete removal of the peroxide.

The tripe which has been treated in the foregoing manner is then placed in the conventional pickling solution (approximately 4.5 per cent acetic acid) and allowed to remain therein until it has acquired the desired pickled flavor, generally much sooner than in the normal pickling period which is approximately 20 days.

The color improvement of the foregoing process is achieved primarily during the initial portion of the treating period in which the tripe is immersed in the treating solution. The improvement in the texture of the tripe continues to develop in the pickling bath and is most pronounced at the end of the pickling treatment.

The following specific examples should be construed as illustrative of the applicant's invention and should not be construed to limit said invention to the specific formulations disclosed therein:

Example I 150 pounds of honeycomb tripe which had been cleaned and cooked in the conventional manner are immersed in a treating bath having the following composition:

200 pounds of water
7.5 pounds of hydrogen peroxide solution (30%)
2.5 gallons of 90 grain vinegar.

The said tripe is allowed to remain immersed in the foregoing solution for approximately 24 hours with occasional stirring to insure complete contact therewith while maintaining the solution at a temperature of about 70° to 75° F. At the end of a 24-hour treating period the tripe is removed from the treating solution and placed in a second container filled with water, and a stream of cool water is allowed to run into the container for about 24 hours. The tripe is now ready for the pickling treatment.

*Example II*

150 pounds of tripe are immersed in a treating solution having the following composition:

150 pounds of water
5 pounds of hydrogen peroxide solution (30%)
1.25 pounds of acetic acid.

The tripe is allowed to remain in the above solution for a period of approximately 18 hours with occasional stirring. At the end of the treating period the tripe is transferred to a second container filled with water and a stream of cold water is allowed to run into the container for about 24 hours. The tripe is then ready for the pickling treatment.

*Example III*

200 pounds of tripe are placed in a treating solution having the following composition:

200 pounds of water
7.5 pounds of hydrogen peroxide solution (30%)
2 pounds of phosphoric acid (85%).

The tripe is allowed to remain in the above solution for a period of approximately 30 hours with occasional stirring. At the end of the treating period the tripe is transferred to a second container filled with water and a stream of cold water is allowed to run into the container for about 24 hours. The tripe is then ready for the pickling treatment.

The tripe, and particularly the honeycomb tripe, treated in accordance with the herein disclosed process, has a much improved appearance and texture and may be more thoroughly pickled in a given pickling period than tripe treated in the customary manner. While there appears to be no ready explanation for the phenomena, tripe which has been treated with the dilute acidic solution in the presence of an oxidizing agent, such as hydrogen peroxide, and tripe which has been first treated with the said acidic solution and thereafter treated with the dilute solution of the oxidizing agent is rendered much more permeable to the pickling solution and absorbs the pickling solution much more rapidly than tripe treated in accordance with the customary method. This unusual property which results from the foregoing treatment is peculiar to tripe and meat tissue having a texture and composition similar to tripe. Moreover, the same improvement in appearance and texture is not obtained if the oxidizing agent, such as hydrogen peroxide, is used in conjunction with a basic reacting composition, such as sodium hydroxide.

While applicant has specifically disclosed the treatment of tripe in the above described manner, it should be understood that other animal tissue similar to tripe may be treated in the same manner. Thus, in addition to tripe such animal products as intestines (casings), tendons, and other substantially non-pigmented animal tissue, such as hides, may be treated in accordance with the herein described process.

While acetic acid is the preferred acid, any non-toxic acidic composition may be employed in the foregoing process, provided the meat tissue is not damaged by the acidic composition. Those skilled in the art will appreciate that such acids as phosphoric, lactic, malic, and propionic acids and the like may be substituted for the preferred acetic acid. The said acidic compositions may effectively be used in concentrations between about 0.1 and 1.0 per cent, although higher concentrations may be used without interfering with the effectiveness of the process. It has been found that the initial pH of the treating bath may vary from approximately 2.5 to 4.3, depending on the concentration of acid employed. Preferably the pH of the treating bath prior to the addition of the tripe is about 3.3. At the end of the treating period the pH of the latter bath will be about 4.8.

Likewise, other non-toxic oxidizing agents may be employed in place of hydrogen peroxide, provided they do not damage the meat tissue or impart an objectionable taste or color to the meat tissue. Thus, for example, other non-toxic oxidizing agents such as the persulfates or the like may be substituted for the preferred aqueous solution of hydrogen peroxide in appropriate concentrations. It has been found satisfactory to employ the oxidizing agents in concentrations between 0.2 and 2.0 per cent. It is preferable to use small amounts of the oxidizing agents and allow the material to remain in the bath for a longer period rather than employ a more concentrated solution of the oxidizing agents for a short time.

Obviously, many modifications and variations of the invention as hereinbefore set forth may be made without departing from the spirit and scope thereof, and therefore only such limitations should be imposed as are indicated in the appended claims.

I claim:

1. A process of pickling tripe in which the appearance, texture, and rate of absorption of pickling solution are substantially improved, comprising the steps of treating the cleaned and cooked tripe from which the mucous membrane has been removed with an aqueous bath maintained at a pH between about 2.5 and 4.8 and containing acetic acid, and between 0.2 and 2.0 per cent of a 30 per cent solution of hydrogen peroxide for a period of between about 6 and 30 hours, immersing said tripe in a water bath to wash substantially all the peroxide therefrom, and thereafter holding the said tripe in an acidic pickling solution to impart the conventional pickled flavor thereto.

2. A process of pickling tripe in which the appearance, texture, and rate of absorption of pickling solution are substantially improved, comprising the steps of immersing for about 24 hours the cleaned and cooked tripe from which the mucous membrane has been removed in a treating bath containing hydrogen peroxide and acetic acid adjusted to an initial pH of about 3.3, maintaining said tripe in a water bath for about 24 hours to wash the peroxide therefrom, and thereafter holding the said tripe in an acidic pickling solution to impart the conventional pickled flavor thereto.

3. A process of pickling a cooked meat product of substantially non-pigmented animal tissue in which the appearance, texture, and rate of absorption of pickling solution are substantially improved, comprising the steps of immersing the cooked meat in an aqueous bath maintained at a pH between about 2.5 and 4.8 containing an oxidizing agent and an acidic reagent for a period of at least 6 hours, washing the said meat in a water bath to remove substantially all the oxidizing agent therefrom, and thereafter holding the said meat in an acidic pickling solution to impart the conventional pickled flavor thereto.

LEVI S. PADDOCK.

References Cited in the file of this patent

UNITED STATES PATENTS

| Number | Name | Date |
| --- | --- | --- |
| 1,988,747 | Oppenheimer | Jan. 22, 1935 |
| 2,117,478 | Hall | May 17, 1938 |
| 2,176,144 | Moskewitz et al. | Oct. 17, 1939 |
| 2,297,441 | Thilenius | Sept. 29, 1942 |
| 2,314,313 | Rinehart | Mar. 16, 1943 |
| 2,485,160 | Niederhauser et al. | Oct. 18, 1949 |

OTHER REFERENCES

"Disinfection and Sterilization," 1945 by E. C. McCulloch, published by Lea and Fehiger, Philadelphia, pages 234, 235, 371–2.